(12) United States Patent
Böhm et al.

(10) Patent No.: US 6,499,797 B1
(45) Date of Patent: Dec. 31, 2002

(54) COMPOSITE COMPONENT FOR VEHICLE BODYWORK

(75) Inventors: Horst Böhm, Frankfurt (DE); Thomas Becher, Rodgau (DE); Rainer Grimm, Frankfurt (DE)

(73) Assignee: Meritor Automotive GmbH, Frankfurt (DE)

( * ) Notice: Subject to any disclaimer, the term of this patent is extended or adjusted under 35 U.S.C. 154(b) by 0 days.

(21) Appl. No.: 09/422,519

(22) Filed: Oct. 21, 1999

(30) Foreign Application Priority Data

Oct. 21, 1998 (DE) .......... 198 48 539
Sep. 27, 1999 (EP) .......... 99118955

(51) Int. Cl.$^7$ .......... B60J 7/00
(52) U.S. Cl. .......... 296/191; 296/214; 296/210; 296/901
(58) Field of Search .......... 296/191, 901, 296/210, 146.5, 214; 428/317.9

(56) References Cited

U.S. PATENT DOCUMENTS

| | | | | |
|---|---|---|---|---|
| 2,138,084 A | * | 11/1938 | Bare | 296/210 |
| 2,791,463 A | * | 5/1957 | Levitt | 296/901 |
| 2,823,951 A | * | 2/1958 | Stahl | 296/214 |
| 3,045,293 A | * | 7/1962 | Potchen | 296/191 |
| 3,123,018 A | * | 3/1964 | Rdey | 296/191 |
| 3,193,440 A | * | 7/1965 | Schafer | 156/285 |
| 3,212,811 A | * | 10/1965 | Strasser | 296/214 |
| 3,864,201 A | * | 2/1975 | Susuki et al. | 428/317.9 |
| 4,002,367 A | * | 1/1977 | Thomas | 296/901 |
| 4,043,589 A | * | 8/1977 | Alfter et al. | 296/214 |
| 4,052,241 A | * | 10/1977 | Walter | 296/214 |
| 4,101,704 A | * | 7/1978 | Hiles | 296/901 |
| 4,119,583 A | * | 10/1978 | Filip et al. | 428/317.9 |
| 4,352,522 A | * | 10/1982 | Miller | 296/901 |
| 4,440,434 A | * | 4/1984 | Celli | 296/191 |
| 4,475,765 A | | 10/1984 | Vogt et al. | |
| 4,584,225 A | * | 4/1986 | Adelman | 296/191 |
| 4,598,008 A | * | 7/1986 | Vogt et al. | 296/901 |
| 4,600,621 A | * | 7/1986 | Maurer et al. | 296/214 |
| 4,690,860 A | * | 9/1987 | Radvan et al. | 428/317.9 |
| 4,705,716 A | * | 11/1987 | Tang | 296/191 |
| 4,721,642 A | * | 1/1988 | Yoshimi et al. | 428/317.9 |
| 4,840,832 A | * | 6/1989 | Weinle et al. | 296/214 |
| 4,911,978 A | * | 3/1990 | Tsubone et al. | 428/317.9 |
| 4,974,900 A | * | 12/1990 | Destefani et al. | 296/191 |
| 4,981,085 A | * | 1/1991 | Watt | 108/146 |
| 5,041,318 A | * | 8/1991 | Hulls | 296/191 |
| 5,049,439 A | * | 9/1991 | Robinson | 428/317.9 |
| 5,150,944 A | * | 9/1992 | Yoshida et al. | 296/191 |
| 5,213,391 A | * | 5/1993 | Takagi | 296/191 |
| 5,288,356 A | * | 2/1994 | Benefiel | 296/191 |
| 5,322,722 A | * | 6/1994 | Rozenberg | 296/191 |
| 5,385,774 A | * | 1/1995 | Cramer et al. | 296/210 |
| 5,393,603 A | * | 2/1995 | Toyoda et al. | 428/317.9 |
| 5,509,247 A | * | 4/1996 | Fortez et al. | 296/214 |
| 5,531,500 A | * | 7/1996 | Podvin | 296/191 |
| 5,664,397 A | * | 9/1997 | Holz | 296/191 |
| 5,700,118 A | * | 12/1997 | Bennett et al. | 296/901 |
| 5,733,631 A | * | 3/1998 | Kelman | 296/191 |
| 5,845,458 A | * | 12/1998 | Patel | 296/210 |
| 5,888,616 A | * | 3/1999 | Ang | 296/191 |
| 5,976,295 A | * | 11/1999 | Ang | 296/191 |
| 6,079,180 A | * | 6/2000 | Wycech | 296/191 |
| 6,093,481 A | * | 7/2000 | Lynn et al. | 428/317.9 |
| 6,124,222 A | * | 9/2000 | Gebreselassie et al. | 296/214 |
| 6,207,244 B1 | * | 3/2001 | Hesch | 296/901 |
| 6,318,797 B1 | * | 11/2001 | Bohm et al. | 296/214 |
| 2001/0003400 A1 | * | 6/2002 | Grimm et al. | 296/210 |

FOREIGN PATENT DOCUMENTS

GB 2311966 10/1997
JP 0199574 * 9/1987 .......... 296/191

* cited by examiner

Primary Examiner—Kiran Patel
(74) Attorney, Agent, or Firm—Carlson, Gaskey & Olds (57) ABSTRACT

A sandwich structure includes a deep-drawn outer skin and a plastic layer foamed onto the inner side of the outer skin. The plastic layer provides a decorative plastic film on its upper surface and a frame at its outer edge. An encircling canting about the plastic layer retains a sheathing that is provided over the entire flat area of the outer skin to increase the modulus of elasticity of the plastic layer.

21 Claims, 5 Drawing Sheets

COMPOSITE COMPONENT FOR VEHICLE BODYWORK

BACKGROUND OF THE INVENTION

The invention relates to a sandwich structure for vehicle bodies, in particular for flat areas of a vehicle including which require sufficient rigidity and good thermal and sonic insulation.

In order to achieve sufficient rigidity in the case of prior art construction of a roof (GM 79 29 367 U1), an initially separate semi-finished profile frame, rigid with respect to torsion, must first be prepared and must then be irremovably fastened to the outer skin of the roof along its edges. The foamed on plastic layer covers the semi-finished product profile frame connected irremovably to the skin of the roof. If the skin of the roof consisting of light metal or plastic is to be effectively made rigid with respect to bending, according to the known proposal, at least one profile strut extending transversely to the longitudinal beams of the semi-finished product profile frame must be provided. The prior art construction of such a roof requires a significant expenditure in material and production.

The corresponding description applies to the sandwich structures for the bodies of vehicles known from GB 2 311 966 A. According to this state of the art, an outer shell and an inner shell for the sandwich structure are produced from plastic by means of injection molding, and connected firmly and tightly to one another in a subsequent step by a plastic welding process or by the application of adhesive along their edges. Then the hollow body so formed is filled with plastic and allowed to harden. Alternatively, a filling body can be prepared in advance which is inserted between the outer and the inner shells when they are connected together. For higher rigidity requirements, reinforcing parts of aluminum must be inserted in the cavity between the outer and inner shells provided the outer shell is formed with channels for accommodating such reinforcing parts.

Finally, roofs of composite material are also known (DE 32 02 594 C2) that are composed of an airtight and rain-tight outer skin, a central honeycombed/structural layer with aluminum or cardboard webs or moderately hard foam and fleece structures, a partly rigid, porous inner layer, and a cushion and/or decorative layer, and produced by means of a hot pressing process.

SUMMARY OF THE INVENTION

In general terms, this invention includes a sandwich structure for a vehicle body. The structure has a deep-drawn outer skin and, foamed onto the inner side of the outer skin, a plastic layer which is provided, if necessary, with a textile flat pattern or a decorative plastic film on its upper surface, the outer skin is formed without a frame at its outer edges, and is provided with an encircling canting where the foamed-on plastic layer reaches up to the canting, and in the foamed-on plastic layer a sheathing—not rigid in itself—is provided over the entire flat area of the outer skin by which method the modulus of elasticity of the foamed-on plastic layer is increased.

According to the invention, a sandwich structure for the body of a vehicle is provided without additional expensive profile elements for frames and struts, but which nonetheless, due to the effect of the outer skin and sheathed plastic layer, achieves a rigidity with respect to bending and total rigidity that satisfies all the stability requirements of the sandwich structure for the operational demands of the vehicle. The sheathing is not rigid in itself—set within the plastic layer makes possible an effective sheathing of the plastic layer up to into the edge areas of the outer skin when formed with an encircling canting in a certain way.

Textiles, knitted materials, fleece, grids, mats, and so on such as glass, plastic (for example, polyester or aramide), and/or carbon fibers which are bendable or not rigid in themselves come into consideration as sheathing to the extent that they are adapted to the form of the outer skin into their edge areas, and can be penetrated and encircled by the foamed-on plastic in the closed foaming tool. Preferably, however, fibrous materials are used for the formation of the sheathing that are incorporated into the plastic layer as sections of fiber lengths in uniform distribution but in unordered position.

Particularly good results were achieved by the use of a sheathing of fiberglass materials that are present in longitudinal sections of twisted fiberglass bundles of ca. 4,800 TEX between ca. 12 mm and ca 100 mm in length. The modulus of elasticity of the foamed plastic material, which has a value of ca. 300 N/mm$^2$ without this sheathing, could be increased to over 1600 N/mm$^2$ according to claim 4 with the application of a fiberglass sheathing of 25 wt % with respect to the total weight of the sheathed plastic foam.

The fiberglass materials can be used in longitudinal sections of different lengths where particularly good sheathing results have been achieved by the use of two different lengths with a larger percentage on the smaller length, about two thirds of the amount of fiberglass. In the scope of the range of longitudinal sections, however, longitudinal sections of a single length can also be used.

Metallic materials such as steel or aluminum sheets are suitable for the outer skin. However, the use of an outer skin of thermoplastic plastic film, deep-drawn in a vacuum, preferably of a two-layer co-extrusion film, yields a sandwich structure of convincing stability.

The co-extrusion film advantageously includes PMMA for the outer layer as well as a mixture of PC and ASA for the inner layer, and has the layer thickness ratios specified whereby the thickness of the outer layer preferably makes up about 15% of the total thickness of the outer skin. For example, the total thickness of the co-extrusion film is about 1.3 mm of which about 0.2 mm is due to the outer layer.

The use of a plastic also offers the advantage that the plastic in the mass can be prepared in the color desired such that the sandwich structure does not have to be retroactively lacquered. The plastic film can furthermore be given a shining surface by use of a high-gloss, polished, deep-drawn form in the form of a shell or a grained surface by previous calendering during the production of the outer skin.

If the outer skin is formed of a thin aluminum sheet, its thickness can be relatively small because of the sheathed plastic layer, preferably ca. 0.6 mm in the interest of conserving weight. For the outer skin the aluminum alloy 0.4 Si 1.2 is particularly suitable.

With the use of an aluminum sheet as material for the deep-drawn outer skin, the sheet can be lacquered ready-made in the desired color through its hydraulic deep-drawn deformation, and provided with a protective film. In the case of the deep-drawn deformation, the lacquer layer remains undamaged after withdrawal of the protective film. The lacquer structure can be multi-layered to withstand the deformation of the aluminum sheet with tears or other damage.

A covering polyester-based lacquer of about 18 to 23 um in thickness can be applied, which in turn can be covered by a clear lacquer layer of PVDF of 22 um thickness to a primary layer of epoxy resin of about 5 to 7 um in thickness a covering lacquer on the basis of polyester of about 18 to 23 um in thickness. The burning in temperature for a multi-layer lacquer structure of this type is about 240° C. The hydraulic deep-drawn deformation of the ready made lacquered aluminum sheet can be done in several steps, for example in three steps. Deep-drawing rates of 60 mm/s have proven themselves as non-damaging for the lacquer structure.

Canting the outer skin before trimming the edges passes into an encircling flange edge angled outwards such that the sheathed plastic layer is guided on the canting up to the flange edge. The trimming of the edge of the sandwich structure, for example by contour cutting or laser section, removes the encircling, angled off flange edge and the outer area of the canting of the outer skin, as well as the sheathed plastic layer adhering to the areas sloping away near it. A canting edge of the outer skin, important for rigidity, and the sheathed plastic layer on the canting edge remains after the trimming. The edge section is guided through the canting as well as through the sheathed plastic layer, forming a section face which, in the case of the vehicle roof, could be set directly on the roof frame located on the vehicle body.

A variant for the encircling canting of the outer skin in which the canting passes into an encircling flange edge angled outward on foaming in of the plastic layer, a seal is applied to the inner side of the outer skin over its entire width to seal the foam form between the lower part and the upper part. In the case of this formation variant, trimming of the edge after the foaming process is entirely omitted. Moreover, the encircling flange edge angled outward can be stamped or fine-cut for the formation of a defined final geometry of the outer skin during deep-drawing of the outer skin or in a subsequent step. With flat application to a seal of the foam form, the encircling flange edge advantageously provides for a good and clean seal of the foam form during the following foaming process. In fact, it is possible in principle that only the outer skin has an encircling canting before the foaming process without an encircling flange edge angled outward that has already been removed, if necessary. However, the sealing of the foam form is then more difficult in structure, in particular the sharp cant of the final canting could have a negative influence on the lifetime of the seal of the foam form.

In a particularly advantageous development of the sandwich structure, there is banded onto the canting of the deep-drawn outer skin, a seal which has a two-legged, essentially U-shaped cross-section, where in the inner leg of the seal is foamed on the plastic layer while the outer leg forms the sealing surface. As a result, the sandwich structure is already provided in an advantageous manner. The plastic layer on the inner side of the outer skin is foamed on with an integrated seal that seals the sandwich structure with respect to the bordering components of the body without additional operational steps. For example, the banding of an additional, initially separately prepared seal onto the finished sandwich structure is necessary for this purpose; which provides additional cost savings. This development offers still another advantage in that during the foaming process the seal bond between the lower part and the upper part of the foam form, such that at this point in the process, no additional sealant has to be provided which would potentially wear by repeated use.

The plastic layer includes a PUR foam that is formed of a polyol and an isocyanate in a specified mixture ratio, about 1 to 2. The mixture of the two plastic components with the fiberglass sheathing is done according to the prior-art LFI process (long fiber injection).

The liquid plastic/fiberglass mass mixed in the mixing head is then applied to the deep-drawn outer skin laid on the lower part of the foaming tool, with its inner side pointing outward, approximately in its center,. beginning over an approximately path before the upper part of the tool is brought into the position above the lower part of the tool corresponding to the intended thickness of the foamed plastic layer. The driven foam fills the form and penetrates into the edge areas of the outer skin, up to the encircling canting of the outer skin. If necessary, the foam may be trimmed later.

If a plastic film is used as the outer skin, the inner side of the outer skin is expediently exposed to flame for activation before the application of the foamable plastic, then an outstanding bonding of the outer skin to the foamed plastic layer is achieved.

In the case where a decorative flat pattern is to be provided on the surface of the foamed on plastic layer, a pattern can be selected. The form of foam applied to the side of the plastic layer away from the outer skin such that a firm bond between the foamed on plastic layer and the decorative flat pattern results. For expediency, the decorative flat pattern may be temporarily stretched on the upper part of the foam tool, would be carried along by this into the foam position, and would remain on the plastic layer after the removal of the upper part of the tool.

A porous decorative flat pattern can be structured in multiple layers, where in the flat pattern is provided with a protective layer turned toward the plastic layer that prevents the penetration of the foamed-on plastic into its layer region through the pores of the decorative flat pattern.

Even in the foaming process, the sandwich structure can be utilized in an advantageous manner with additional function elements. Thus, a sandwich structure, can be provide for example in a vehicle roof whose outer skin has an opening on the side of the plastic layer. A guide profile for any optionally closing sliding cover where the opening is foamed on.

A sound absorbing surface layer structure can be foamed behind the plastic layer away from the outer skin, even during the foaming process, whereby the sound insulating characteristics of the sandwich structure can be improved still further for the formation of, as an example, hoods for a motor. Finally, instead of or in addition to the above measures relating to the macrogeometry of the surface of the plastic layer, a structuring of the microgeometry of the side of the sandwich structure turned away from the outer skin said structuring corresponding to the current sound-insulating requirements—can also be done. According to which partially damaging regions with reduced density of the foam material are foamed on the side of the plastic layer away from the outer skin. This foaming of the damping regions on the plastic layer is done expediently in a second shot; that is, after foaming of the plastic layer on the inner side of the outer skin in a subsequent step, the damping regions are foamed on the plastic layer.

BRIEF DESCRIPTION OF THE DRAWINGS

Other advantages of the present invention will be readily appreciated as the same becomes better understood by reference to the following detailed description when considered in connection with the accompanying drawings wherein:

In FIGS. 1 and 2 a deep-drawn outer skin 1, a plastic layer 2 foamed on the inner side of the outer skin 1, and a decorative flat pattern 3 located on the layer side of the vehicle roof can be seen. In FIG. 1 the vehicle roof is turned with its inner side upward in preparation for the foaming process, while in FIG. 2 the vehicle roof is represented in its mounted position. In FIG. 2 frame 4 of the roof for the body of a vehicle and a covering 5 for frame 4 of the roof are drawn schematically in dotted lines. The vehicle roof sits on and above the frame 4 of the roof. and is connected to it in a manner according to prior art, but not represented.

FIG. 11 shows an enlarged broken section of the sandwich structure wherein the outer skin is formed of aluminum.

DETAILED DESCRIPTION OF THE PREFERRED EMBODIMENT

Figure 1:
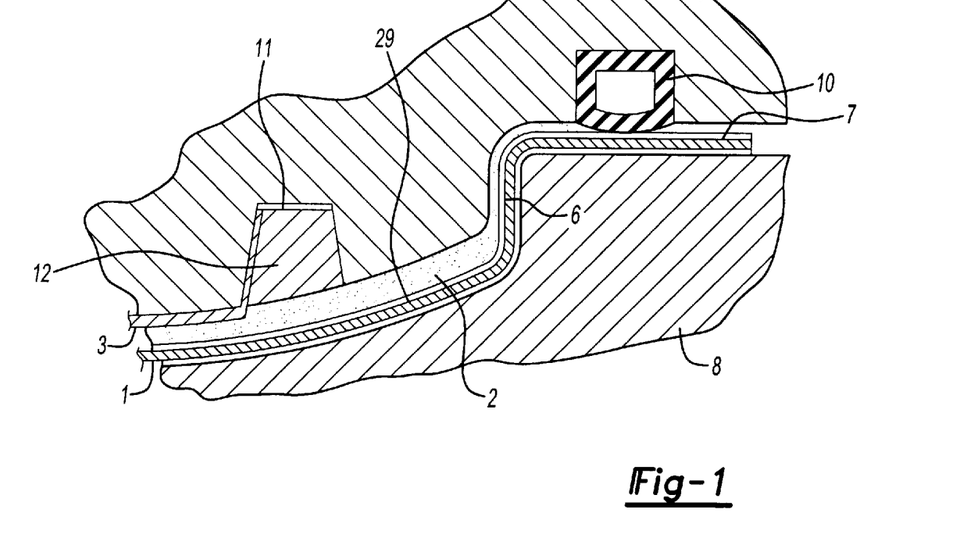
FIG. 1, a broken section through the edge area of a vehicle roof located in a closed foam form, according to a first embodiment example of the invention.
Figure 2:
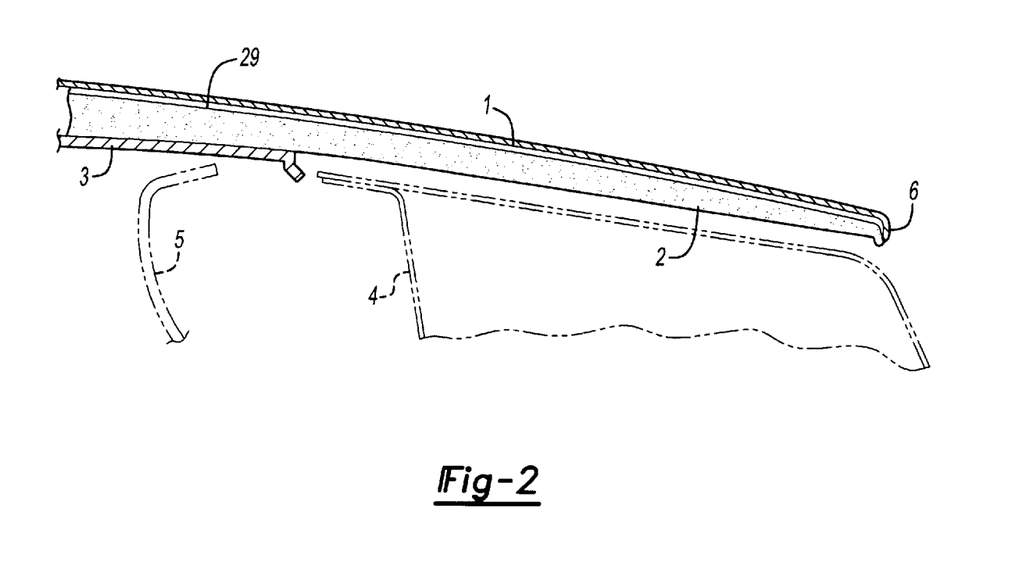
FIG. 2, a broken section through the edge area of the finished vehicle roof according to the first embodiment example of the invention.

In FIGS. 1 and 2, only one edge is shown as representative of the other edges. If, in the following discussion, the vehicle roof or the hood for a motor is mentioned, we are dealing with a preferred use of the invention without restrictive meaning.

The outer skin 1 has an encircling canting 6 at its edges from a central portion 100 of the outer skin 1. The canting in the case of this embodiment example first of all has a greater height (FIG. 1) for reproduction of the vehicle roof prior to the trimming of the edges (FIG. 2). As shown in FIG. 1, the encircling canting 6 becomes an encircling flange edge 7 angled outward there from that is removed during the later edge trimming process, as may be seen as a comparison of FIGS. 1 and 2.

The foam form represented in FIG. 1 consists of a lower part 8 accommodating the deep-drawn outer skin 1 in a form-fitting, and a complimentary upper part 9 in whose edge area an inflatable encircling seal 10 is provided that provides a bound for the plastic to be foamed when forming the plastic layer 2. The decorative flat pattern 3 is fastened in stretched form by means of a stretching frame 12 introduced in groove 11 temporarily on upper part 9 of the foam form.

In the production of the vehicle roof, the outer skin 1 is first deep-drawn, in the use of a sheet metal material by multi-layer deep-drawing hydraulics, and in the use of a plastic film by deep-drawing in a vacuum with corresponding stretching of the edge of the film. In the latter case, both sides of the plastic film to be deep-drawn are heated by heating elements to about 180° C. surface temperature. Thus heated, the plastic film is subjected to the process of deep-drawing in a vacuum.

The deep-drawn preformed article of the outer skin 1 is then laid with its inner side pointing upward into the lower part 8 of the foam form represented in FIG. 1. The plastic to be foamed on is applied to the inner side of the outer skin 1 in the manner specified above. In the case where the outer skin is of plastic film, this process can be previously activated by exposure to flame. As foam plastic, for example, a foam system of the Elastogran Company may be used, consisting of Polyol B 237 and Isocyanate E 3509, where these two components are applied in the mixture ratio of 100 parts polyol to 210 parts isocyanate. After the application of the plastic mass to be foamed on, utilizing the LFI process (the prior-art long fiber injection process), the upper part 9 of the form is brought into position with the flat pattern 3 fastened thereon. Then the plastic loaded with fiberglass to be foamed on fills the entire free space of the foam form up to the upper side of the flange edge 7, and is bounded there by the inflated seal 10.

For example, 3.7 kg of the foam plastic components are mixed with 1 kg fiberglass which corresponds to a percentage of glass in the foam plastic of greater than 25%.

Figure 9A:
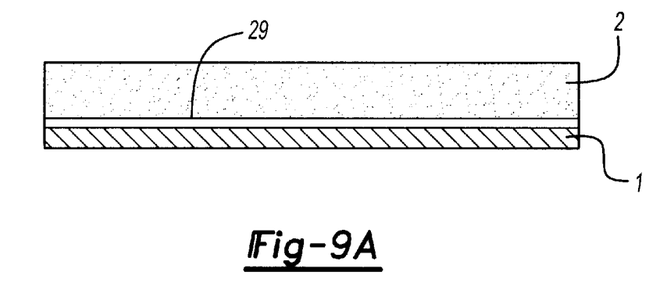
FIG. 9A shows an enlarged view of a section of the plastic layer including longitudinal sections of sheathing, such as fiberglass material, of several different lengths.
Figure 9B:
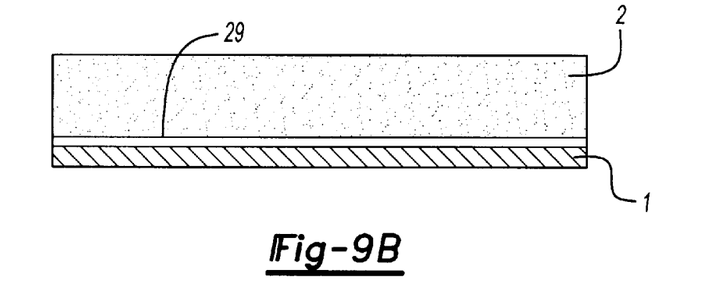
FIG. 9B shows an enlarged view of a section of the plastic layer including longitudinal sections of sheathing, such as fiberglass material, of a single length.

The sheathings 29, preferably of fiberglass material that are present in longitudinal sections, are illustrated in FIGS. 9A and 9B. FIG. 9A illustrates one embodiment in which the longitudinal sections of sheathings 29 are of different lengths. It is preferred that two different lengths are used with a larger percentage of the smaller lengths. However, as illustrated in FIG. 9B, longitudinal sections of sheathings 29 are of a single length.

Textiles, knitted materials, fleece, grids, mats, and so on such as glass, plastic (for example, polyester or aramide), and/or carbon fibers which are bendable or not rigid in themselves come into consideration as sheathing to the extent that they are adapted to the form of the outer skin into their edge areas, and can be penetrated and encircled by the foamed-on plastic in the closed foaming tool. Preferably, however, fibrous materials are used for the formation of the sheathing that are incorporated into the plastic layer as sections of fiber lengths in uniform distribution but in unordered position.

Particularly good results were achieved by the use of a sheathing of fiberglass materials that are present in longitudinal sections of twisted fiberglass bundles of ca. 4,800 TEX between ca. 12 mm and ca 100 mm in length. The modulus of elasticity of the foamed plastic material, which has a value of ca. 300 N/mm$^2$ without this sheathing, could be increased to over 1600 N/mm$^2$ according to claim 4 with the application of a fiberglass sheathing of 20 to 30 wt %, preferably 25 wt %, with respect to the total weight of the sheathed plastic foam.

According to the second embodiment example, the vehicle roof shown in FIG. 3 in the foam form is intended to be described below only with regard to the features differing from the first embodiment example.

Along with the outer encircling canting 6, the outer skin 1 in this embodiment example also possesses an inner encircling canting 13 that is angled in the same direction as the canting. In the finished state of the vehicle roof bounds an opening of the roof that can optionally be covered by means of a sliding cover not represented. The plastic layer 2 extends up to the canting 6 and 13 thereby providing the vehicle roof with a sufficient rigidity.

Furthermore, it is seen that, when located in the foam form, a flange edge angled outward or inward is adjacent neither to the canting 6 nor to the canting 13. Here in an inner and outer trimming of the edges of the outer skin which even after the deep-drawing process, flange edges of the outer skin 1 may still be present are removed before the outer skin 1 is laid into the lower part 8 of the foam form. Expediently, the canting 6 of the outer skin 1 laid into the lower part 8 of the foam form will project slightly over the lower part 8.

Figure 10:
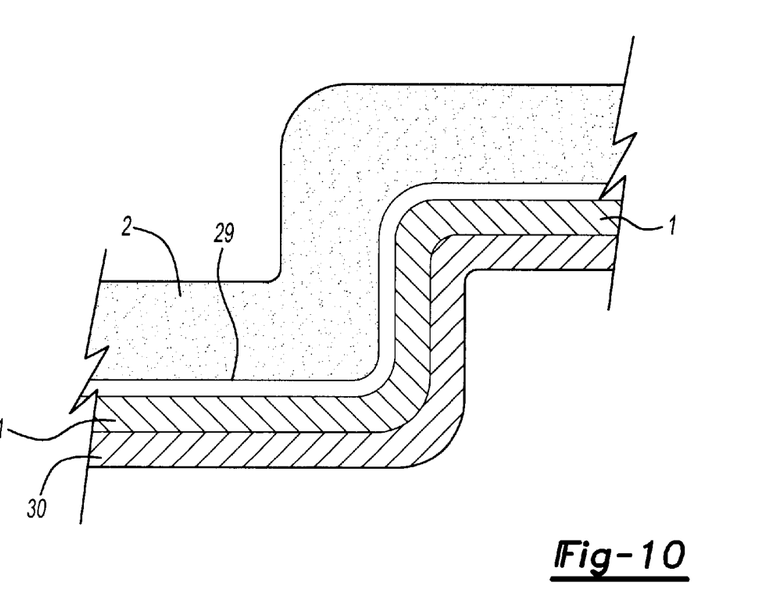
FIG. 10 shows an enlarged broken section of the sandwich structure wherein the outer skin includes a two layer film.

Metallic materials such as steel or aluminum sheets are suitable for the outer skin 1. However, the use of an outer skin of thermoplastic plastic film, deep-drawn in a vacuum, preferably of a two-layer co-extrusion film, illustrated in FIG. 10, yields a sandwich structure of convincing stability. The co-extrusion film advantageously includes PMMA for the outer layer 30 as well as a mixture of PC and ASA for the inner layer 31, and has the layer thickness ratios specified whereby the thickness of the outer layer preferably makes up about 15% of the total thickness of the outer skin. For example, the total thickness of the co-extrusion film is about 1.3 mm of which about 0.2 mm is due to the outer layer.

The use of a plastic also offers the advantage that the plastic in the mass can be prepared in the color desired such that the sandwich structure does not have to be retroactively lacquered. The plastic film can furthermore be given a shining surface by use of a high-gloss, polished, deep-drawn form in the form of a shell or a grained surface by previous calendering during the production of the outer skin.

If the outer skin 1 is formed of a thin aluminum sheet as shown in FIG. 11, its thickness can be relatively small because of the sheathed plastic layer between ca mm 0.5 mm to 0.8 mm, preferably ca. 0.6 mm, in the interest of conserving weight. For the outer skin the aluminum alloy 0.4 Si 1.2 is particularly suitable.

With the use of an aluminum sheet as material for the deep-drawn outer skin 1, the sheet can be lacquered ready-made in the desired color through its hydraulic deep-drawn deformation, and provided with a protective film 32. In the case of the deep-drawn deformation, the lacquer layer remains undamaged after withdrawal of the protective film 32. The lacquer structure can be multi-layered to withstand the deformation of the aluminum sheet with tears or other damage.

A groove 19 as well as an application face 20 are constructed during the foaming process by suitable formation of the upper part 9 of the foam form. The groove 19 serves in mounting of the modular roof by receiving a dab of adhesive. This allows the vehicle roof to be fastened to the roof frame on the vehicle side, while application face 20 in the mounted state of the vehicle roof makes contact with the roof frame.

In the finished state of the vehicle roof, the guide rail 14 is foamed flatly onto the plastic layer 2 such that the guide rail 14 is integrally connected to the vehicle roof without an additional fastening agent being necessary. In particular, it is to be pointed out that the vehicle roof, can be pre-equipped with a sliding cover as a consequence of its formation with encircling cantings 6 and 13 on the outer skin 1. The cover extends therebetween plastic layer 2 and does not require a reinforcing frame, customary in the state of the art, that encircles the opening of the roof and to which the guide rails for the sliding cover are fastened in the customary manner.

Figure 3:
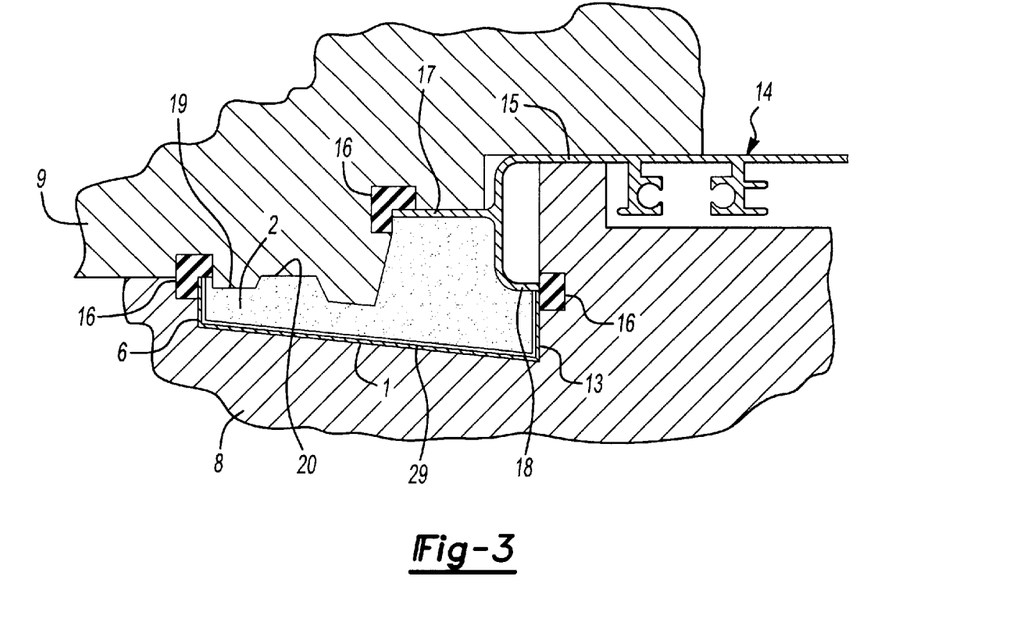
FIG. 3, a broken section through the edge area of a vehicle roof, located in a closed foam form pre-equipped for a sliding roof according to a second embodiment example of the invention.
Figure 4:
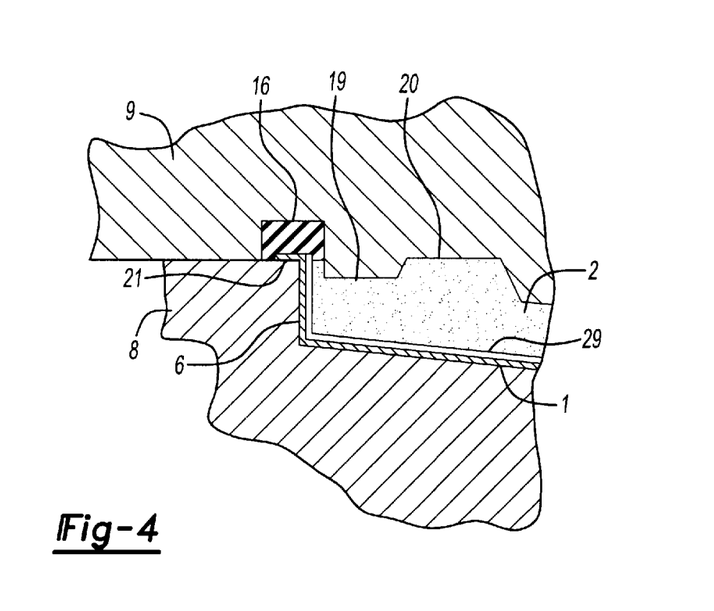
FIG. 4, a broken section through the edge area of the finished vehicle roof located in a closed foam, according to a third embodiment example of the invention.

The third embodiment example shown in FIG. 4 is distinguished from the second embodiment example described in FIG. 3 by the fact that the canting 6 of the outer skin 1 passes into an encircling flange edge 21 angled outward therefrom. Counter to the first embodiment example, the encircling flange edge 21 is formed so short that, on foaming on the sheathed plastic layer 2, it lies flat over its entire width on the inner side of the outer skin 1 seal 16 in the upper part 9 of the foam form. Since the flange edge 21 lies in this case on the lower part of the foam form, it is pressed into the seal 16 in the closed state of the foam form.

As a result, the foam form is reliably sealed between the lower part 8 and the upper part 9 for the foaming process without any danger existing that the canting 6 or the flange edge 21 will damage the seal 16. Also, in the case of this embodiment example, the trimming of the edge of the outer skin 1 is done before the skin is laid into the lower part 8 of the foam form. The trimming of the edge can be executed at the same time as the deep-drawing of the outer skin 1, or in a subsequent step thereto by stamping or fine-cutting.

Figure 5:
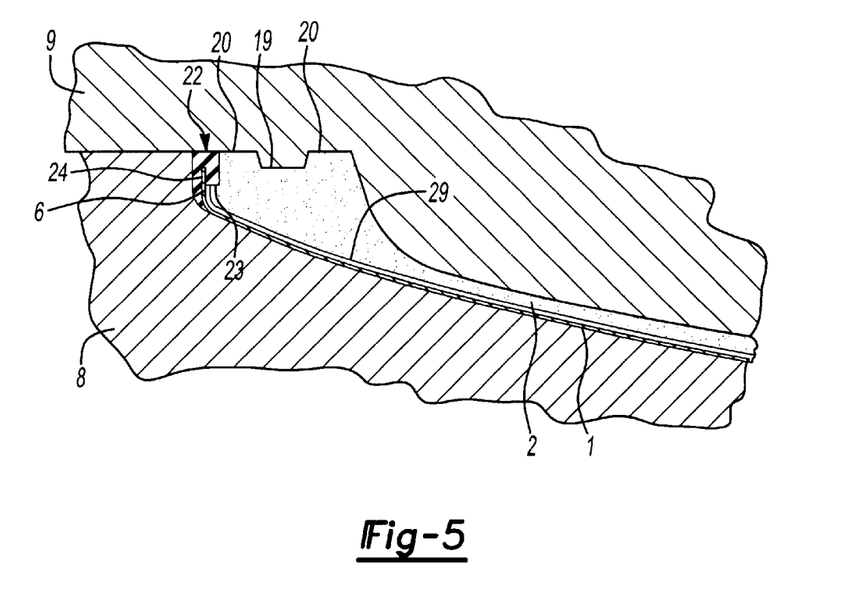
FIG. 5, a broken section through the edge area of the finished vehicle roof located in a closed foam, according to a fourth embodiment example of the invention.
Figure 6:
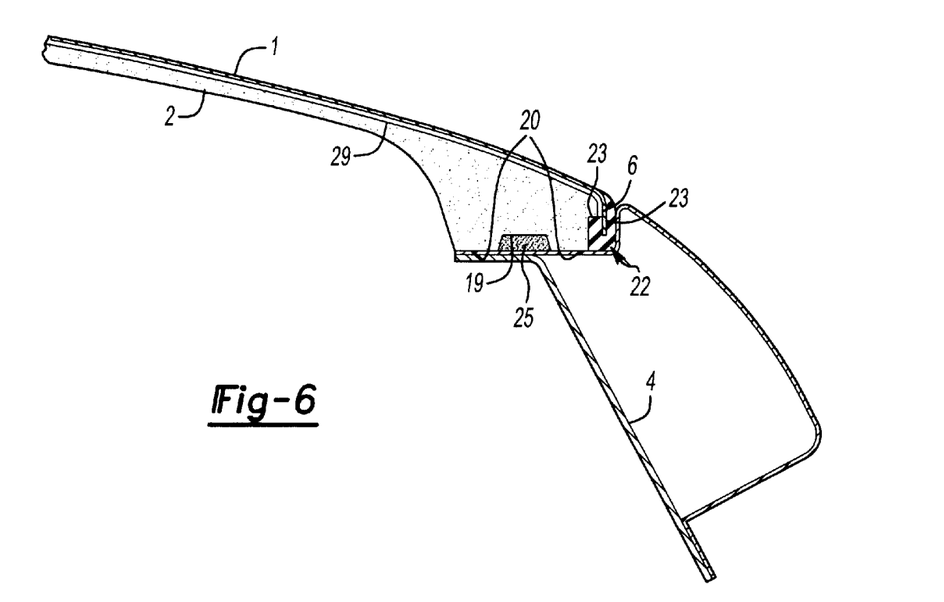
FIG. 6, a broken section through the edge area of the finished vehicle roof, which is mounted on a frame of the roof, according to the fourth embodiment example of the invention.

In the case of the fourth embodiment example represented in FIGS. 5 and 6, a seal 22, also encircling, is bonded onto the encircling canting 6 of the outer skin 1, said seal having a two-legged, essentially U-shaped cross-section. As illustrated in FIG. 5, seal 22 is foamed with plastic layer 2 on the already edge-trimmed outer skin 1 during the foaming of the plastic layer 2. Its inner leg 23 preferably extends over only part of the entire height of the canting 6 such that the sheathed plastic layer 2 can also reach up to the canting 6. During the foaming process seal 22 advantageously serves as a sealing element between the lower part 8 and the upper part 9 of the foaming form.

As can be seen in FIG. 6, the outer leg 24 forms seal 22 on the vehicle roof mounted on the vehicle body. It forms a sealing face to seal between the vehicle roof and frame 4 of the vehicle and the outer leg 24 of seal 22 due to its elasticity has the effect of centering the vehicle roof with respect to frame 4 of the roof. Seal 22 consists of material, for example cellular rubber or EPDM, that can sufficiently withstand the thermal and mechanical stresses in the foam form and in the vehicle roof. Finally, FIG. 6 illustrates how the vehicle roof is connected to frame 4 by means of a dab of adhesive 25 received in groove 19.

Figure 7:
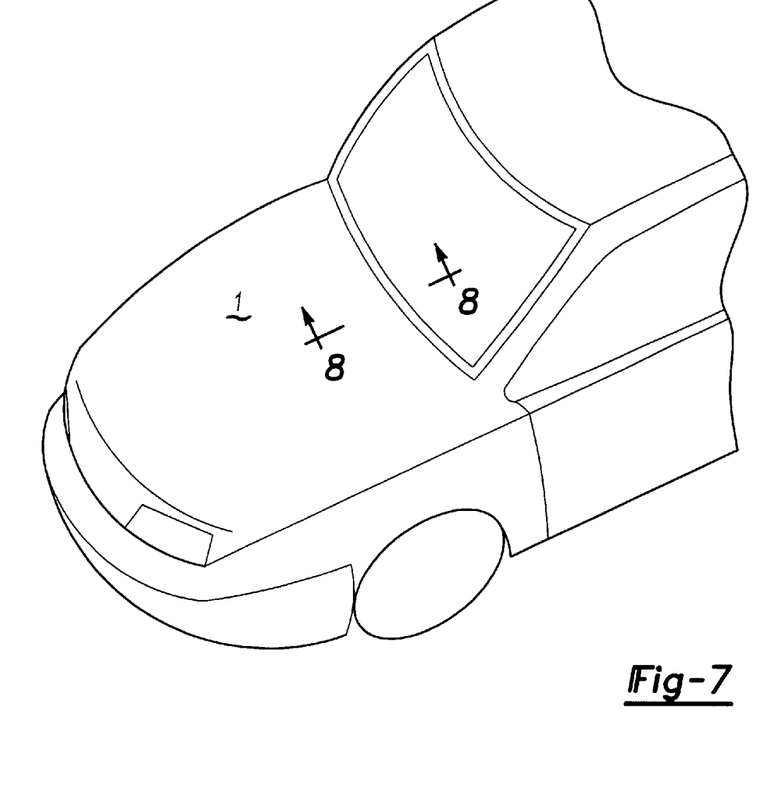
FIG. 7, a schematic perspective view of a hood for a motor already mounted on a body of a motor vehicle, according to the invention.
Figure 8:
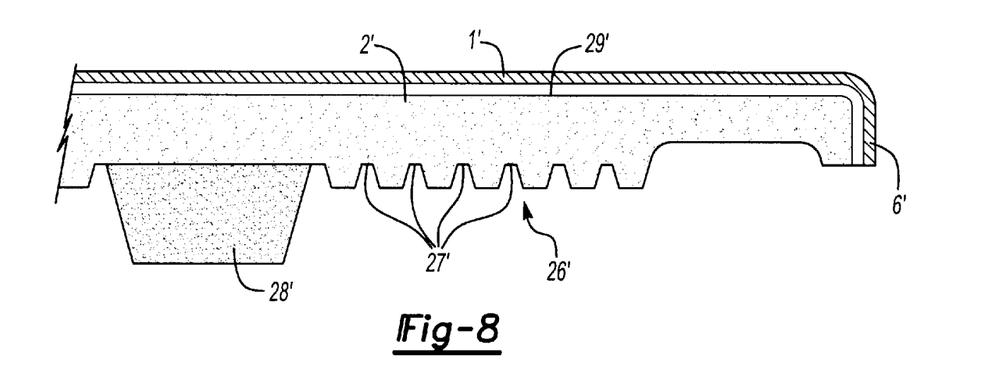
FIG. 8, a broken section of the hood for the motor corresponding to the line A—A in FIG. 7.

It was mentioned initially that not only vehicle roofs but also arbitrary surface areas of vehicle bodies can be formed by the sandwich structures constructed as described. An example of this is represented in FIGS. 7 and 8 which show a hood for a vehicle whose deep-drawn outer skin 1' is formed at its edges without a frame and is provided with an encircling canting 6. The plastic layer 2' is foamed on the inner side of the outer skin 1', in which a sheathing 29' not rigid in itself is provided over the entire surface area of the outer skin 1' and contacts the encircling canting 6'.

Furthermore, FIG. 8 illustrates the improved sound-insulating characteristics of such sandwich structures. Thus, corresponding to groove 19, on foaming of the plastic layer 2' a sound-absorbing surface structure 26' is foamed on the inner side of the outer skin 1' on the side of the plastic layer 2' away from the outer skin 1'. The structure in the disclosed embodiment has a plurality of parallel grooves 27' affecting the reflection of sound. Likewise, it is possible at the side of the plastic layer 2' that is away from the outer skin 1' to foam on partially damping regions 28' with reduced density of the PUR foam materials in a second shot, thereby achieving a porous or open-cell microstructure of the surface. A PUR material is a form formed of a polyol and an isocyanate in a specified mixed ratio.

A sandwich structure, in particular for a vehicle roof, is proposed consisting of a deep drawn outer skin 1' of sheet metal or plastic film and a plastic layer 2' foamed on the inner side of the outer skin 1'. The plastic layer 2' possess an inner sheathing due to fibrous materials incorporated in uniform distribution in it, preferably fiberglass, which, in tandem with the outer skin, lead to the sandwich structure a significant stability of form and rigidity. It is essential in this case that the fiber-sheathed plastic layer 2' also strengthens an edge canting of the outer skin 1'.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A structure for a vehicle body, comprising:
   a deep-drawn outer skin;
   a plastic layer foamed on a first side of said outer skin, said outer skin having a canting that contacts said plastic layer; and
   a sheathing adjacent said outer skin and in said plastic layer, said sheathing increasing the modulus of elasticity of said plastic layer.

2. The structure according to claim 1, wherein said sheathing is formed of a uniformly distributed fibrous material.

3. The structure according to claim 1, wherein said sheathing is formed of twisted longitudinal sections of fiberglass materials of 4,800 tex between 12.5 mm and 100 mm in length.

4. The structure according to claim 3, wherein said fiberglass materials is between 20 and 30 wt % of the total weight of the sheathed plastic.

5. The structure according to claims 3, wherein said longitudinal sections have different lengths.

6. The structure according to claim 3, wherein said longitudinal sections have a single length.

7. The structure according to claim 1, wherein said outer skin is a thermoplastic film having two-layers.

8. The sandwich structure according to claim 7, wherein said outer skin includes an outer layer and an inner layer, and said outer layer consists of polymethylmethacrylate (PMMA) and the inner layer consists of a mixture of polycarbonate (PC) and acrylonitrile styrene acrylic acid ester (ASA) where the thickness of the outer layer is between 10% to 30% of the total thickness of the outer skin.

9. The structure according to claim 7, wherein said outer layer includes a shining surface.

10. The structure according to claim 7, wherein said outer layer includes a grained surface.

11. The structure according to claim 1, wherein said outer skin is hydraulically deep-drawn from a thin aluminum sheet and possesses a thickness of 0.5 mm to 0.8 mm.

12. The structure according to claim 11, wherein said aluminum sheet further includes a protective film for the formation of said outer skin.

13. The structure according to claim 1, wherein there is an inner encircling canting and an outer encircling canting.

14. The sandwich structure according to claim 1, further comprising a seal attached to said canting, said seal having a two-legged cross-section including an inner leg which is foamed on said plastic layer and an outer leg which forms a sealing surface.

15. The sandwich stricture according to claim 8, further comprising a decorative flat pattern on said plastic layer opposite said outer skin.

16. The sandwich structure according to claim 1, further comprising a guide rail foamed on said plastic layer to be integral to said plastic layer.

17. The sandwich structure according to claim 1, further comprising a sound absorbing surface structure adjacent said plastic layer .

18. The sandwich structure according to claim 1, further comprising a damping region having reduced foam density material adjacent said plastic layer.

19. The sandwich structure according to claim 8, wherein the thickness of the outer layer is preferably ca. 15% of the total thickness of the outer skin.

20. The structure according to claim 1, wherein said deep drawn outer skin is non-planar, and said canting is formed by side portions extending in a direction towards said first side.

21. The structure according to claim 1, further including a flange at an opposing end of said canting from a central portion of said outer skin, said flange and said canting being non-planar.

* * * * *

UNITED STATES PATENT AND TRADEMARK OFFICE
CERTIFICATE OF CORRECTION

PATENT NO.    : 6,499,797 B1
DATED         : December 31, 2002
INVENTOR(S)   : Bohm et al.

It is certified that error appears in the above-identified patent and that said Letters Patent is hereby corrected as shown below:

Column 10,
Lines 28-31, Claim 15 should read as follows:

15. The sandwich structure according to Claim 8, wherein said seal is adjacent a lower part and an upper part of said foam form Signed and Sealed this Thirteenth Day of May, 2003

JAMES E. ROGAN
*Director of the United States Patent and Trademark Office*